United States Patent [19]

Nakamura

[11] Patent Number: 5,756,897
[45] Date of Patent: May 26, 1998

[54] ACCELERATION SENSOR

[75] Inventor: Takeshi Nakamura, Uji, Japan

[73] Assignee: Murata Manufacturing Co., Ltd., Japan

[21] Appl. No.: 702,940

[22] Filed: Aug. 26, 1996

[30]   Foreign Application Priority Data

Aug. 24, 1995 [JP] Japan .................. 7-240734

[51] Int. Cl.$^6$ ..................... G01P 15/08
[52] U.S. Cl. .............. 73/514.29; 73/514.37
[58] Field of Search .............. 73/514.29, 514.36, 73/514.37, 514.34, 514.16; 310/329

[56]           References Cited

U.S. PATENT DOCUMENTS

| 4,766,768 | 8/1988 | Norling et al. | 73/514.29 |
| 4,881,408 | 11/1989 | Hulsing et al. | 73/514.29 |
| 5,170,665 | 12/1992 | Janlaud et al. | 73/514.16 |

FOREIGN PATENT DOCUMENTS 6-249874   9/1994   Japan .................. 73/514.34

*Primary Examiner*—John E. Chapman
*Attorney, Agent, or Firm*—Ostrolenk, Faber, Gerb & Soffen, LLP

[57]              ABSTRACT

An acceleration sensor includes a vibrator provided as a detecting element in a cantilever structure for detecting acceleration. A U-shaped pendulum, for example, is disposed so as to surround the vibrator. The pendulum is supported on the supporting side (upper end side) of the vibrator such as to be rotatable on pivot shafts and in a direction of detection of acceleration by the vibrator. A weight is attached to a central portion of the pendulum on the external side. An extreme end of the vibrator (the lower end of the vibrating plate) is attached to the central portion of the pendulum on the internal side through an elastic member. It is preferable that a tensile stress is caused in the vibrator in the lengthwise direction of the vibrator by the pendulum acting through the elastic member.

10 Claims, 2 Drawing Sheets

ACCELERATION SENSOR

BACKGROUND OF THE INVENTION

1. Field of the Invention

The present invention relates to acceleration sensors and, more particularly, to an acceleration sensor having a detecting element in a cantilever structure for detecting acceleration.

2. Description of the Related Art

An acceleration sensor is known in which a weight is attached to an end of a detecting element in a cantilever structure for detecting acceleration.

In this conventional acceleration sensor, since a weight is attached to an end of the detecting element, the detecting element bends largely when it undergoes acceleration, so that a signal obtained from the detecting elements is large and so that the acceleration detection sensitivity is high.

However, since a weight is supported by the detecting element in the conventional acceleration sensor, it is necessary for the detecting element to have a large mechanical strength for supporting the weight.

Also, since a weight is attached to an extreme end of the detecting element in the conventional acceleration sensor, there is a risk of the detecting element being broken by an excessive impact caused by a fall or the like. To avoid such breaking of the detecting element, a stopper for preventing the detecting element from being excessively deformed may be provided in the vicinity of the detecting element. However, such a stopper must be provided as a separate member.

Further, in this conventional acceleration sensor, the detecting element may warp with a change in temperature to output an erroneous signal.

SUMMARY OF THE INVENTION

It is therefore a main object of the present invention to provide an acceleration sensor in which it is not necessary for the detecting element to have a large mechanical strength, and in which the acceleration detection sensitivity is high.

According to the invention, there is provided an acceleration sensor including a detecting element for detecting acceleration, a pendulum and a weight. The detecting element has a cantilever structure and is supported at a first end thereof. The pendulum is pivotably supported on a side of the first end of the detecting element, and a second end of the detecting element is joined to a tip of the pendulum to which the weight is attached.

The detecting element is preferably joined to the pendulum through an elastic member. In such a case, a tensile stress may be caused in the detecting element in the lengthwise direction of the detecting element by the pendulum acting through the elastic member.

In the acceleration sensor of this invention, the weight is attached to and supported on the pendulum. Therefore, it is not necessary for the detecting element to have a large mechanical strength for supporting the weight.

Further, in the acceleration sensor of this invention, since an extreme end of the detecting element is joined to the weight, the weight and the pendulum swing and the detecting element bends largely when they undergo acceleration, so that a signal obtained from the detecting element is large and so that the acceleration detection sensitivity is high.

According to the invention, an acceleration sensor can be obtained in which it is not necessary for the detecting element to have a large mechanical strength, and in which the acceleration detection sensitivity is high.

Also, since the weight is supported on the pendulum in this acceleration sensor, the detecting element cannot easily be broken by an excessive impact caused by a fall or the like. Therefore, the acceleration sensor of this invention does not require a stopper for preventing the detecting element from deforming excessively.

Also, in the acceleration sensor of this invention, if the extreme end of the detecting element is joined to the weight through the elastic member, a misalignment which may occur between a swing of the weight and the pendulum and bending of the detecting element can be absorbed by the elastic member. Accordingly, a deterioration of the strength of the joint between the detecting element and the weight due to such a misalignment can be limited by the elastic member.

Also, in the acceleration sensor of this invention, if a tensile stress is caused in the detecting element in the lengthwise direction by the elastic member, the detecting element does not bend to a considerable extent with a change in temperature. In this case, therefore, it is possible to limit an erroneous signal output from the detecting element due to bending of the detecting element.

For the purpose of illustrating the invention, there is shown in the drawings several forms which are presently preferred, it being understood, however, that the invention is not limited to the precise arrangements and instrumentalities shown.

DETAILED DESCRIPTION OF A PREFERRED EMBODIMENT

Figure 1:
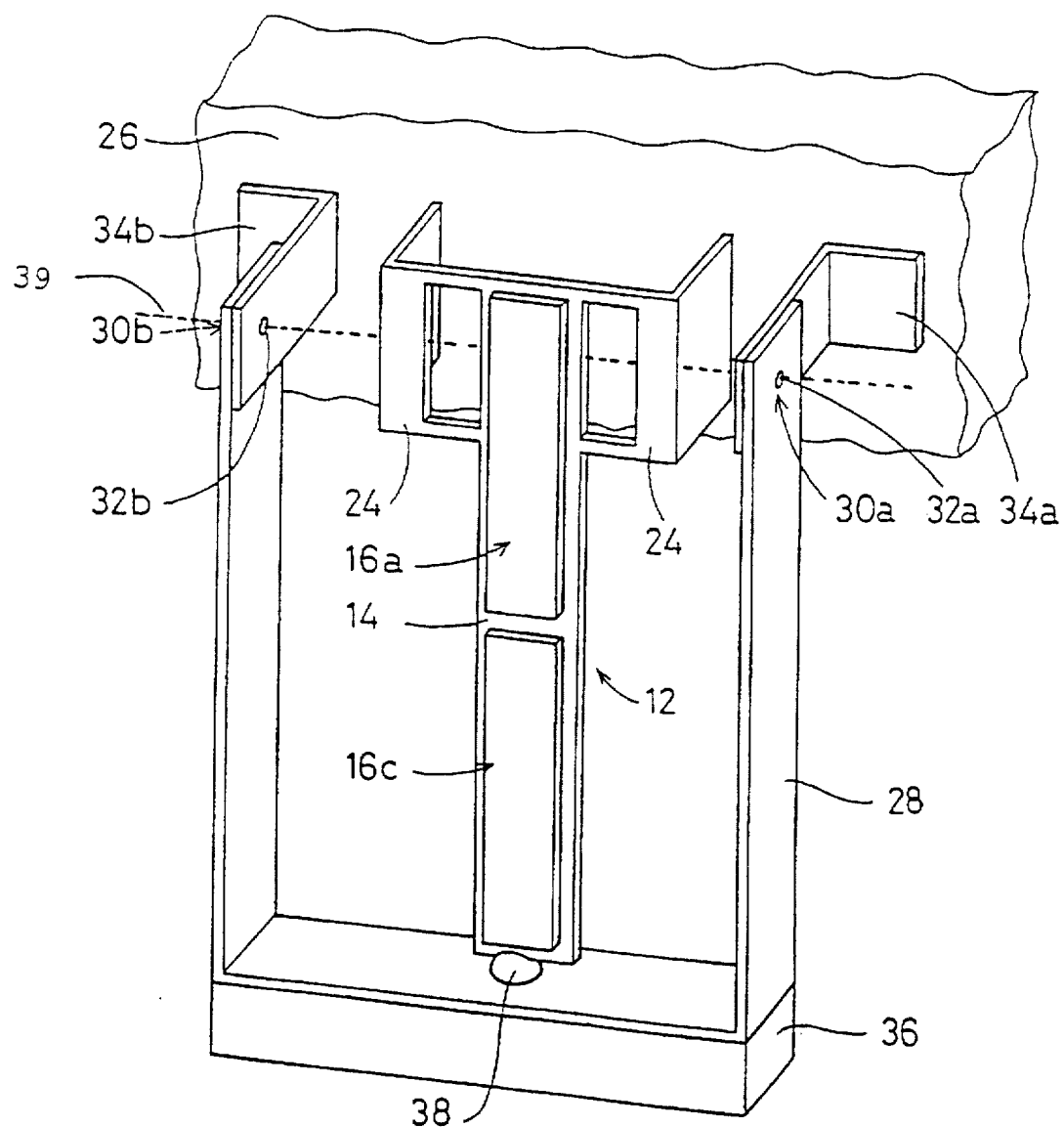
FIG. 1 is a perspective view of an acceleration sensor according to an embodiment of this invention.
Figure 2:
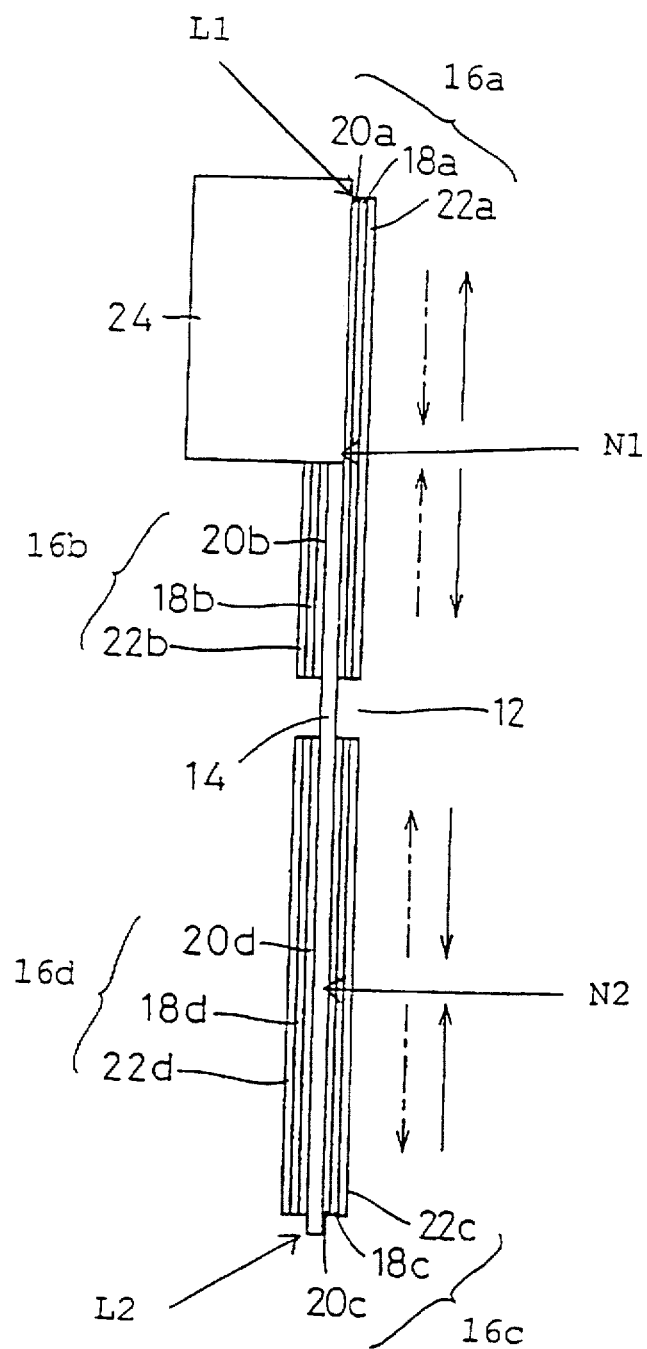
FIG. 2 is a side view of a vibrator forming part of the acceleration sensor shown in FIG. 1, as viewed from the left in FIG. 1.

Hereinafter, the preferred embodiments of the present invention are explained in detail with reference to the drawings. FIG. 1 is a perspective view of an acceleration sensor 10 according to an embodiment of the invention, and FIG. 2 is a side view of a vibrator of the acceleration sensor 10 shown in FIG. 1, as viewed from the left in FIG. 1. The acceleration sensor 10 includes, as a detecting element, a vibrator 12 capable of vibrating in the lengthwise direction.

As best shown in FIG. 2, the vibrator 12 includes a vibrating member 14 having a thin rectangular shape. The vibrating member 14 is formed of, for example, nickel, iron, titanium or an alloy of these metals, for example, a permanently elastic metal such as elinvar or iron-nickel alloy. The vibrating member 14 may alternatively be formed of a non-metallic material capable of vibrating mechanically, for example, quartz, glass, crystal or ceramic.

Two piezoelectric elements 16a and 16b are formed on two major surfaces of a portion of the vibrating member 14 on the upper end side (on one side of a center with respect to the lengthwise direction) opposite from each other. The piezoelectric element 16a has a piezoelectric material layer 18a formed of, for example, a ceramic. Electrodes 20a and 22a are respectively formed on two major surfaces of the piezoelectric material layer 18a so as to interpose the piezoelectric material layer 18a. The electrode 20a is bonded to one of the two major surfaces of the vibrating member 14 with an adhesive, for example. Similarly, the other piezoelectric element 16b includes a piezoelectric material layer 18b formed of, for example, a ceramic. Electrodes 20b and 22b are respectively formed on two major surfaces of the piezoelectric material layer 18b. The electrode 20b is bonded to the other major surface of the vibrating member 14 with an adhesive, for example. The piezoelectric material layers 18a and 18b of the piezoelectric elements 16a and 16b are polarized from the electrodes 22a and 22b toward the electrodes 20a and 20b, that is, in the direction of thickness from the external side toward the vibrating member 14 side.

Further, two piezoelectric elements 16c and 16d are formed on two major surfaces of a portion of the vibrating member 14 on the lower end side (on the other side of the center with respect to the lengthwise direction) opposite from each other. The piezoelectric element 16c includes a piezoelectric material layer 18c formed of, for example, a ceramic. Electrodes 20c and 22c are respectively formed on two major surfaces of the piezoelectric material layer 18c. The electrode 20c is bonded to one of the two major surfaces of the vibrating member 14 with an adhesive, for example. Similarly, the other piezoelectric element 16d includes a piezoelectric material layer 18d formed of, for example, a ceramic. Electrodes 20d and 22d are respectively formed on two major surfaces of the piezoelectric material layer 18d. The electrode 20d is bonded to the other major surface of the vibrating member 14 with an adhesive, for example. The piezoelectric material layers 18c and 18d of the piezoelectric elements 16c and 16d are polarized from the electrodes 20c and 20d toward the electrodes 22c and 22d, that is, in the direction of thickness from the vibrating member 14 side toward the external side.

If drive signals having the same phase are applied to the piezoelectric elements 16a to 16d, the vibrator 12 vibrates in the lengthwise direction. In this case, since the piezoelectric elements 16a and 16b and the piezoelectric elements 16c and 16d are polarized in opposite directions, they are displaced in opposite directions. Therefore, the portion of the vibrating member 14 on the upper end side extends when the portion of the vibrating member 14 on the lower end side contracts, as indicated by the solid line arrows in FIG. 2. Conversely, the portion of the vibrating member 14 on the lower end side in the lengthwise direction extends when the portion of the vibrating member 14 on the upper end side contracts, as indicated by the dot-dash line arrows in FIG. 2. Since the amount of extension and contraction of the portion of the vibrating on the upper end side and the amount of extension and contraction of the portion of the vibrating member 14 on the lower end side are canceled out, the distance between the upper and lower ends of the vibrating member 14 is substantially constant. Further, the vibration of the vibrating member 14 has nodes at a central portion N1 between the piezoelectric elements 16a and 16b and a central portion N2 between the piezoelectric elements 16c and 16d. Also, the vibration of the vibrating member 14 has loops (antinodes) at the upper end Li and the lower end L2 of the vibrating member 14.

As best shown in FIG. 1, two supporting members 24 are formed on the vibrator 12 on the upper end side. More specifically, the two supporting members 24 are formed integrally with the vibrating member 14 by extending in a widthwise direction from the periphery of the upper nodal potion N1 and from the end portions L1 of an upper-end-side nodal portion of the vibrating member 14. These supporting members 24 support portions of the vibrator 12 on the upper end side so that the vibrator 12 has a cantilever structure. These supporting members 24 are fixed on a supporting plate 26.

A U-shaped pendulum 28 is disposed so as to surround the vibrator 12. The pendulum 28 is supported on the supporting side (upper end side) of the vibrator 12 such as to be rotatable in a direction of detection of acceleration by the vibrator 12. Specifically, circular holes 30a and 30b are respectively formed in opposite end portions of the pendulum 28. In the holes 30a and 30b, cylindrical pivot shafts 32a and 32b are inserted respectively rotatably. As shown in FIG. 1, it is preferable that a rotation axis 39 traversing the holes 30a and 30b intersects the vibrator 12 or is located in the vicinity of either of the major surfaces of the vibrator 12. These pivotal shafts 32a and 32b are inserted into and fixed to L-shaped supporting pieces 34a and 34b, respectively. These supporting pieces 34a and 34b are fixed to the supporting plate 26 on the opposite sides of the two supporting members 24. Thus, this pendulum 28 is supported on the supporting side of the vibrator 12 so as to be rotatable on the pivotal shafts 34a and 34b in the direction of detection of acceleration by the vibrator 12.

A weight 36 is attached to a central portion of the pendulum 28 on the external side so as to be positioned at a tip of the pendulum 28 with respect to the rotation axis 39. The weight 36 is provided for the purpose of increasing bending of the vibrator 12 caused by acceleration. To achieve this effect, an extreme end of the vibrator 12 (the lower end of the vibrating plate 14) is attached to the central portion of the pendulum 28 on the internal side through an elastic member 38 such as a rubber member. That is, the extreme end of the vibrator 12 is joined to the weight 36 through the elastic member 38. A tensile stress is caused in the vibrator 12 in the lengthwise direction of the vibrator 12 by the elastic member 38.

In the acceleration sensor 10, if drive signals having the same phase are applied to the four piezoelectric elements 16a to 16d, the vibrator 12 vibrates in the lengthwise direction, as indicated by the solid line arrows and dot-dash line arrows in FIG. 2.

If the vibrating member 14 of the vibrator 12 undergoes acceleration in a direction perpendicular to the major surfaces of the vibrating member 14, the vibrating member 14 bends according to the acceleration together with the piezoelectric elements 16a to 16d to generate signals on the piezoelectric elements 16a and 16d according to the bending. Some of the signals generated on the piezoelectric elements 16a to 16d may be measured to detect the acceleration.

In this acceleration sensor 10, since the end of the vibrator 12 is joined to the weight 36, the weight 36 and the pendulum 28 swing and the vibrator 12 bends largely when they undergo acceleration, so that the signals obtained from the piezoelectric elements 16a to 16d of the vibrator 12 are large and so that the acceleration detection sensitivity is high.

Further, since the weight 36 is attached to and supported on the pendulum 28 in this acceleration sensor 10, it is not necessary for the vibrator 12 to have a large mechanical strength for supporting the weight 36.

Also, since the weight 36 is supported on the pendulum 28 in this acceleration sensor 10, the mass of the weight 36 can be increased regardless of the mechanical strength of the vibrator 12. In the acceleration sensor 10, therefore, the acceleration detection sensitivity can be adjusted by changing the mass of the weight 36. In particular, this acceleration sensor 10 can easily be designed so as to improve the acceleration detection sensitivity.

Also, since the weight 36 is supported on the pendulum 28 in the acceleration sensor 10, the vibrator 12 cannot easily be broken by an excessive impact caused by a fall or the like. Further, in the acceleration sensor 10, the pendulum 28 is disposed so as to surround the vibrator 12. Therefore, the vibrator 12 is protected from external influences or the like by the pendulum 28. For this reason, in the acceleration sensor 10, there is no need for a stopper for preventing the vibrator 12 from deforming excessively.

Also, in the acceleration sensor 10, the extreme end of the vibrator 12 is joined to the weight 36 through the elastic member 38. Therefore, even if a misalignment occurs between a swing of the weight 36 and the pendulum 28 and bending of the vibrator 12, it can be absorbed by the elastic member 38. Accordingly, a deterioration of the strength of the joint between the vibrator 12 and the weight 36 due to such a misalignment can be limited by the elastic member 38.

Also, in the acceleration sensor 10, a tensile stress is caused in the vibrator 12 in the lengthwise direction by the elastic member 38. Therefore, the vibrator 12 does not bend to a considerable extent with a change in temperature. For this reason, it is possible to limit an erroneous signal output from the piezoelectric elements 16a to 16d due to bending of the vibrator 12.

Further, if in the acceleration sensor 10 there is a need to change the piezoelectric elements because of variation in characteristics, only the vibrator 12 may be changed without changing the pendulum 28 and the weight 36, which is advantageous in terms of economy.

In the above-described embodiment of the present invention, the vibrator is arranged to vibrate in the lengthwise direction because, if a resonance characteristic of the vibrator is utilized, the acceleration detection sensitivity can be improved due to a change in resonance characteristic when the vibrator undergoes acceleration. According to the present invention, however, a vibrator other than such a vibrator may be used as a detecting element in a cantilever structure for detecting acceleration.

In the above-described embodiment of the present invention, the pendulum 28 is provided in a U-shaped form. According to the present invention, however, the pendulum may be provided in any other form; for example, it may be V- or I-shaped.

Further, in the above-described embodiment of the present invention, acceleration can be detected by detecting the difference between signals generated on the piezoelectric elements 16a and 16b or the difference between signals generated on the piezoelectric elements 16c and 16d.

Also, in the above-described embodiment of the present invention, the direction of polarization of one or more of the piezoelectric elements may be reversed and the phase of the drive signal applied to the piezoelectric element in which the direction of polarization is reversed may be reversed.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An acceleration sensor comprising:

a detecting element for detecting acceleration, said detecting element having a cantilever structure and being supported at a first end thereof;

a pendulum pivotably supported adjacent to a side of said first end of said detecting element and being freely rotatable on an axis; and a weight attached to a tip of said pendulum, wherein a second end of said detecting element is joined to said tip of said pendulum.

2. An acceleration sensor according to claim 1, wherein said second end of said detecting element is joined to said pendulum through an elastic member.

3. An acceleration sensor according to claim 2, wherein a tensile stress is caused in said detecting element in the lengthwise direction of the same by said pendulum acting through said elastic member.

4. An acceleration sensor according to claim 1, wherein the detector includes a vibrator whose magnitude of vibration is a function of the acceleration of said pendulum.

5. An acceleration sensor according to claim 4, wherein said vibrator is a piezoelectric vibrator.

6. An acceleration sensor according to claim 5, wherein said piezoelectric vibrator includes an elongated vibratable member having piezoelectric elements attached thereto for vibrating said vibratable member and for detecting the magnitude of vibration.

7. An acceleration sensor, comprising:

a support;

a U-shaped pendulum having a pair of spaced legs and a transverse cross piece connected to respective first ends of the legs, respective second ends of the legs having coaxial pivot axes and being fixedly connected to said support so as to be freely rotatable on the coaxial pivot axes;

a vibratable detection member disposed intermediate said first and second legs of said pendulum, said vibratable detection member having a first end and an opposed second end, said first end of said vibratable detection member being fixedly connected to the support and said second end of said vibratable detection member being elastically connected to the cross piece of the pendulum; and a weight attached to said cross piece of said pendulum.

8. An acceleration sensor according to claim 7, wherein said pivot axes extend such that they pass through or in the vicinity of the vibratable member.

9. An acceleration sensor according to claim 8, wherein said vibratable detection member is a piezoelectric vibratable detection member.

10. An acceleration sensor according to claim 9, wherein said piezoelectric vibratable detection member includes an elongated vibratable member having piezoelectric elements attached thereto for vibrating said vibratable member and for detecting the magnitude of vibration.

* * * * *